(12) United States Patent
Dintenfass et al.

(10) Patent No.: US 10,433,196 B2
(45) Date of Patent: Oct. 1, 2019

(54) SYSTEM FOR TRACKING RESOURCE ALLOCATION/USAGE

(71) Applicant: Bank of America Corporation, Charlotte, NC (US)

(72) Inventors: Katherine Dintenfass, Lincoln, RI (US); Alicia C. Jones-McFadden, Fort Mill, SC (US); Matthew Hsieh, Charlotte, NC (US); Victoria L. Dravneek, Charlotte, NC (US); Cameron D. Wadley, Waxhaw, NC (US); Jason Christian Karmelek, Mendon, MA (US); Andrew Saar, Sandy Springs, GA (US); Amber J. Quitadamo, Woodstock, GA (US)

(73) Assignee: Bank of America Corporation, Charlotte, NC (US)

( * ) Notice: Subject to any disclaimer, the term of this patent is extended or adjusted under 35 U.S.C. 154(b) by 135 days.

(21) Appl. No.: 15/176,458

(22) Filed: Jun. 8, 2016

(65) Prior Publication Data
US 2017/0359740 A1    Dec. 14, 2017

(51) Int. Cl.
*H04W 24/08* (2009.01)
*H04W 4/18* (2009.01)
(Continued)

(52) U.S. Cl.
CPC .......... *H04W 24/08* (2013.01); *G06T 19/006* (2013.01); *H04W 4/18* (2013.01); *H04W 12/08* (2013.01);
(Continued)

(58) Field of Classification Search
CPC ....... H04W 24/05; H04W 12/06; H04W 4/18; H04L 47/80; H04M 1/72522
See application file for complete search history.

(56) References Cited

U.S. PATENT DOCUMENTS

| 5,768,633 A | 6/1998 | Allen et al. |
| 5,930,776 A | 7/1999 | Dykstra et al. |

(Continued)

FOREIGN PATENT DOCUMENTS

| JP | 2007266143 A | 10/2007 |
| KR | 1020090047614 A | 5/2009 |
| KR | 1020090105734 A | 10/2009 |

OTHER PUBLICATIONS

Secondary markets explain credit score: Taylor, Marshal. Real Estate Finance Today 13.7(Apr 1, 1996):16.
(Continued)

*Primary Examiner* — Uzma Alam
(74) *Attorney, Agent, or Firm* — Michael A. Springs; Moore & Van Allen PLLC; Anup Iyer (57) ABSTRACT

Systems, computer program products, and methods are described herein for tracking resource allocation/usage across a dispersed Internet protocol capable network connecting devices electrically attached to the network. The present invention is configured to receive, from a first user computing device, a first user request for authorization to access at least one of the one or more computing devices; initiate the augmented reality application for display on the at least one of the one or more computing devices; reconfigure, via the augmented reality application, a display device associated with the first user computing device to emulate a content displayed on a display device associated with at least one of the one or more computing devices on the display device of the first user computing device; retrieve, using the first user computing device, information from the content; process, using the first computing device, the retrieved information; and display the processed information.

20 Claims, 3 Drawing Sheets

(51) Int. Cl.
    *H04W 12/08*    (2009.01)
    *G06T 19/00*    (2011.01)
    *H04W 24/04*    (2009.01)
    *H04M 1/725*    (2006.01)

(52) U.S. Cl.
    CPC ........ *H04W 24/04* (2013.01); *H04M 1/72522* (2013.01)

(56) References Cited

U.S. PATENT DOCUMENTS

| | | |
|---|---|---|
| 6,202,055 B1 | 3/2001 | Houvener et al. |
| 6,522,772 B1 | 2/2003 | Morrison et al. |
| 6,533,392 B1 | 3/2003 | Koitabashi |
| 6,636,249 B1 | 10/2003 | Rekimoto |
| 6,658,393 B1 | 12/2003 | Basch et al. |
| 6,674,993 B1 | 1/2004 | Tarbouriech |
| 6,764,003 B1 | 7/2004 | Martschitsch et al. |
| 6,856,965 B1 | 2/2005 | Stinson et al. |
| 7,016,532 B2 | 3/2006 | Boncyk et al. |
| 7,062,454 B1 | 6/2006 | Giannini et al. |
| 7,110,964 B2 | 9/2006 | Tengler et al. |
| 7,154,529 B2 | 12/2006 | Hoke et al. |
| 7,155,228 B2 | 12/2006 | Rappaport et al. |
| 7,309,015 B2 | 12/2007 | Frantz et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,509,279 B2 | 3/2009 | Chhabra et al. |
| 7,526,280 B2 | 4/2009 | Jung et al. |
| 7,548,884 B1 | 6/2009 | Thomas |
| 7,564,469 B2 | 7/2009 | Cohen |
| 7,565,008 B2 | 7/2009 | Boncyk et al. |
| 7,607,570 B1 | 10/2009 | Constantine |
| 7,615,446 B2 | 11/2009 | Kim et al. |
| 7,634,448 B1 | 12/2009 | Ramachandran |
| 7,653,597 B1 | 1/2010 | Stevanovski et al. |
| 7,668,777 B2 | 2/2010 | White et al. |
| 7,680,324 B2 | 3/2010 | Boncyk et al. |
| 7,693,585 B2 | 4/2010 | Kalan et al. |
| 7,721,954 B1 | 5/2010 | Karamian et al. |
| 7,734,539 B2 | 6/2010 | Ghosh et al. |
| 7,735,728 B2 | 6/2010 | Wallerstorfer |
| 7,742,991 B2 | 6/2010 | Salzmann et al. |
| 7,775,437 B2 | 8/2010 | Cohen |
| 7,792,738 B2 | 9/2010 | Channell |
| 7,827,099 B1 | 11/2010 | Cotton |
| 7,831,471 B2 | 11/2010 | Adams |
| 7,840,031 B2 | 11/2010 | Albertson et al. |
| 7,881,243 B2 | 2/2011 | Hardy et al. |
| 7,881,529 B2 | 2/2011 | Boncyk et al. |
| 7,881,994 B1 | 2/2011 | An et al. |
| 7,895,102 B1 | 2/2011 | Wilks et al. |
| 7,899,243 B2 | 3/2011 | Boncyk et al. |
| 7,899,252 B2 | 3/2011 | Boncyk et al. |
| 7,899,750 B1 | 3/2011 | Klieman et al. |
| 7,962,128 B2 | 6/2011 | Neven et al. |
| 7,970,649 B2 | 6/2011 | Wu |
| 7,983,971 B1 | 7/2011 | McLuckie et al. |
| 7,988,060 B2 | 8/2011 | Killian et al. |
| 8,121,944 B2 | 2/2012 | Norman et al. |
| 8,138,930 B1 | 3/2012 | Heath |
| 8,145,594 B2 | 3/2012 | Geisner et al. |
| 8,154,428 B2 | 4/2012 | Do et al. |
| 8,180,377 B2 | 5/2012 | Yang et al. |
| 8,190,502 B2 | 5/2012 | Moran et al. |
| 8,195,551 B2 | 6/2012 | Moore et al. |
| 8,233,673 B2 | 7/2012 | Britz et al. |
| 8,275,685 B2 | 9/2012 | Ross et al. |
| 8,335,741 B2 | 12/2012 | Komegay et al. |
| 8,385,971 B2 | 2/2013 | Rhoads et al. |
| 8,387,861 B2 | 3/2013 | Constantine |
| 8,392,450 B2 | 3/2013 | Blanchflower et al. |
| 8,423,452 B1 | 4/2013 | Ley et al. |
| 8,423,469 B2 | 4/2013 | Marlow et al. |
| 8,433,631 B1 | 4/2013 | An et al. |
| 8,433,650 B1 | 4/2013 | Thomas |
| 8,438,110 B2 | 5/2013 | Calman et al. |
| 8,442,906 B1 | 5/2013 | Thomas |
| 8,447,689 B2 | 5/2013 | Ghosh et al. |
| 8,566,197 B2 | 10/2013 | Satyavolu et al. |
| 8,571,888 B2 | 10/2013 | Calman et al. |
| 8,600,857 B2 | 12/2013 | Satyavolu et al. |
| 8,622,287 B2 | 1/2014 | Constantine |
| 8,645,971 B2 | 2/2014 | Carlson et al. |
| 8,650,105 B2 | 2/2014 | Satyavolu et al. |
| 8,718,612 B2 | 5/2014 | Calman et al. |
| 8,730,243 B2 | 5/2014 | Wenholz et al. |
| 8,744,946 B2 | 6/2014 | Shelton |
| 8,898,087 B1 | 11/2014 | Salzmann et al. |
| 9,196,007 B1 | 11/2015 | Thomas |
| 9,588,730 B2 * | 3/2017 | Mitchell ................. G06F 3/147 |
| 9,626,799 B2 * | 4/2017 | McArdle ............. G06F 3/04815 |
| 9,747,723 B2 * | 8/2017 | Gardes ................. G06T 19/006 |
| 9,767,613 B1 * | 9/2017 | Bedikian ............... G06T 19/006 |
| 2002/0029386 A1 | 3/2002 | Robbins |
| 2002/0095363 A1 | 7/2002 | Sloan et al. |
| 2002/0124188 A1 | 9/2002 | Sherman et al. |
| 2002/0138418 A1 | 9/2002 | Zarin et al. |
| 2002/0198822 A1 | 12/2002 | Munoz et al. |
| 2003/0064705 A1 | 4/2003 | Desiderio |
| 2003/0083957 A1 | 5/2003 | Olefson |
| 2004/0021584 A1 | 2/2004 | Hartz, Jr. et al. |
| 2004/0024709 A1 | 2/2004 | Yu et al. |
| 2004/0049402 A1 | 3/2004 | Dojo et al. |
| 2004/0068751 A1 | 4/2004 | Basawapatna et al. |
| 2004/0177030 A1 | 9/2004 | Shoham |
| 2004/0186807 A1 | 9/2004 | Nathans et al. |
| 2005/0010506 A1 | 1/2005 | Bachann |
| 2005/0149437 A1 | 7/2005 | Zellner et al. |
| 2005/0162523 A1 | 7/2005 | Darrell et al. |
| 2005/0177501 A1 | 8/2005 | Thomas |
| 2005/0187860 A1 | 8/2005 | Peterson et al. |
| 2005/0273430 A1 | 12/2005 | Pliha |
| 2006/0095351 A1 | 5/2006 | Gershenfeld et al. |
| 2006/0100951 A1 | 5/2006 | Mylet et al. |
| 2006/0161487 A1 | 7/2006 | Saxena et al. |
| 2006/0242047 A1 | 10/2006 | Haggerty et al. |
| 2007/0100749 A1 | 5/2007 | Bachu et al. |
| 2007/0106558 A1 | 5/2007 | Mitchell et al. |
| 2007/0140595 A1 | 6/2007 | Taylor et al. |
| 2007/0156554 A1 | 7/2007 | Nikoley et al. |
| 2007/0162971 A1 | 7/2007 | Blom et al. |
| 2007/0240186 A1 | 10/2007 | Silver et al. |
| 2007/0279521 A1 | 12/2007 | Cohen |
| 2007/0288373 A1 | 12/2007 | Wilkes |
| 2008/0018340 A1 | 1/2008 | Amou et al. |
| 2008/0021803 A1 | 1/2008 | Ahles et al. |
| 2008/0040278 A1 | 2/2008 | DeWitt |
| 2008/0070198 A1 | 3/2008 | Dempsey |
| 2008/0120133 A1 | 5/2008 | Krishnaswami et al. |
| 2008/0214210 A1 | 9/2008 | Rasanen et al. |
| 2008/0243721 A1 | 10/2008 | Joao |
| 2008/0267447 A1 | 10/2008 | Kelusky et al. |
| 2008/0268876 A1 | 10/2008 | Gelfand et al. |
| 2009/0006191 A1 | 1/2009 | Arankalle et al. |
| 2009/0061949 A1 | 3/2009 | Chen |
| 2009/0089131 A1 | 4/2009 | Moukas et al. |
| 2009/0094125 A1 | 4/2009 | Killian et al. |
| 2009/0102859 A1 * | 4/2009 | Athsani ................. G06F 3/011 345/619 |
| 2009/0121271 A1 | 5/2009 | Son et al. |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0204511 A1 | 8/2009 | Tsang |
| 2009/0237546 A1 | 9/2009 | Bloebaum et al. |
| 2009/0250515 A1 | 10/2009 | Todd et al. |
| 2009/0251963 A1 | 10/2009 | Seol et al. |
| 2009/0271313 A1 | 10/2009 | Chaudhari et al. |
| 2010/0002204 A1 | 1/2010 | Jung et al. |
| 2010/0103241 A1 | 4/2010 | Linaker |

(56) References Cited

U.S. PATENT DOCUMENTS

| | | | |
|---|---|---|---|
| 2010/0130226 A1 | 5/2010 | Arrasvuori et al. | |
| 2010/0185529 A1 | 7/2010 | Chesnut et al. | |
| 2010/0228776 A1 | 9/2010 | Melkote et al. | |
| 2010/0250581 A1 | 9/2010 | Chau | |
| 2010/0255795 A1 | 10/2010 | Rubinsky et al. | |
| 2010/0274691 A1 | 10/2010 | Hammad et al. | |
| 2010/0277412 A1 | 11/2010 | Pryor | |
| 2010/0281432 A1 | 11/2010 | Geisner et al. | |
| 2010/0306712 A1 | 12/2010 | Snook et al. | |
| 2010/0306715 A1 | 12/2010 | Geisner et al. | |
| 2011/0022540 A1 | 1/2011 | Stern et al. | |
| 2011/0034176 A1 | 2/2011 | Lord et al. | |
| 2011/0047075 A1 | 2/2011 | Fourez | |
| 2011/0077046 A1 | 3/2011 | Durand et al. | |
| 2011/0079639 A1 | 4/2011 | Khan | |
| 2011/0106622 A1 | 5/2011 | Kuhlman et al. | |
| 2011/0119155 A1 | 5/2011 | Hammad et al. | |
| 2011/0202460 A1 | 8/2011 | Buer et al. | |
| 2011/0202466 A1 | 8/2011 | Carter | |
| 2011/0281644 A1* | 11/2011 | Kawamoto | G06T 19/006 463/30 |
| 2011/0295731 A1 | 12/2011 | Waldron, III et al. | |
| 2012/0100915 A1 | 4/2012 | Margalit et al. | |
| 2012/0162255 A1* | 6/2012 | Ganapathy | H04L 67/38 345/633 |
| 2012/0330753 A1 | 12/2012 | Urbanski et al. | |
| 2013/0010068 A1* | 1/2013 | Tiernan | G06K 9/228 348/46 |
| 2013/0011111 A1 | 1/2013 | Abraham et al. | |
| 2013/0278631 A1* | 10/2013 | Border | G02B 27/017 345/633 |
| 2014/0043436 A1* | 2/2014 | Bell | G06T 19/20 348/46 |
| 2014/0375684 A1* | 12/2014 | Algreatly | G06T 19/006 345/633 |
| 2015/0099252 A1* | 4/2015 | Anderson | G09B 19/003 434/257 |
| 2015/0156803 A1* | 6/2015 | Ballard | H04W 76/10 455/422.1 |
| 2015/0234477 A1* | 8/2015 | Abovitz | G06F 16/7837 382/103 |
| 2015/0243029 A1* | 8/2015 | Herling | G06K 9/00664 348/46 |
| 2015/0262208 A1* | 9/2015 | Bjontegard | G06Q 30/0205 705/7.31 |
| 2016/0034932 A1 | 2/2016 | Sion et al. | |
| 2016/0337505 A1* | 11/2016 | Bjontegard | H04W 4/029 |

OTHER PUBLICATIONS

Brokers cautioned about overreliance on credit scoring; La Monica, Paul R. American Banker [New York, N.Y.] Jun. 26, 1997: 11:1.

Spouses share liability for each other's credit debts:[Morning Edition]: Edmond Sanders: The Orange County Register [Santa Ana, Calif] Mar. 30, 1998:d05.

PCT International Search Report and Written Opinion, PCT/US08/61425, dated Jan. 15, 2009, 9 pages.

PCT International Preliminary Report on Patentability, PCT/US2008/061425, dated Nov. 5, 2009, 7 pages.

Value Checking Accounts, The Business of Valuing Checking Accounts and Scoring Consumer Risk, Critical Point Group, Inc., http://www.criticalpointgroup.com/valuingchecking.html, downloaded Mar. 15, 2007, 2 pages.

Supplemental European Search Report, Application No./Patent No. 08746786.6-2221/2140422 PCT/US20008061425, dated Feb. 12, 2015, 6 pages.

Chinese Office Action dated Apr. 26, 2011, Chinese Patent Application 200880022066.3, 18 pages.

Credit cards could have no limits [Transaction would not work unless funds were previously transffered into credit card bank account], Boufford, John, ComputerWorld Canada, North York; Oct. 20, 2000, vol. 16, Iss. 21; http://proquestumic.om/pgdweb?index=27&sid=4&srchmode=1&vinst-PROD&fmt=3&st . . . , downloaded Sep. 6, 2011, 2 pages.

E3 Corp. Acquires Market Data Solutions, Inc. and eMillenium, Inc. to Take Demand-based Inventory Forecasting to the Next Level, PR Newswire, New York, Apr. 17, 2000, http://proquestumic.om/pgdweb?index=0&sid=6&srchmode=1&vinst-PROD&fmt=3&st . . . , downloaded Sep. 6, 2011, 3 pages.

European Search Report, Application No. 11167182.2-1238, dated Oct. 11, 2019, 8 pages.

New Zealand Patent Office Examination Report, Patent Application No. 580698, dated Apr. 13, 2011, 3 pages.

Lengyel, Zoltan, International Financial Law Review, v19n5 PP; 73; May 2000, ISSN 0262-69689, JRNL Code: IFL.

Kelly J. Andrews, Target Marketing, v. 23, n. 1, p. 22—Jan. 2000. Copyright Phillips Business Information, Inc.; Credit Risk Management Report, v9, n3, pNA; Feb. 22, 1999.

Scientific and Technical Information Center; EIC 3600 Search Results, pp. 1-89, Nov. 4, 2009.

Visualize-Your-Spending-With-Compass, https://www.lgfcu.org/visualize-your-spending-with-compass, 4 pages.

Open Spending, https://openspending.org, 5 pages.

M.J. Welch (2010). Addressing the Challenges in Underspecification in Web Search. (Order No. 3446833, University of California, Los Angeles). ProQuest Dissertations and Theses; 137; retrieved from http://search.proquest.com/docview/858101500?accountid=14753. (858101500).

K.J. Jeevan & P. Padhi (2006). A Selective Review of Research in Content Personalization. Library Review, 55(9), 556-586. doi:http:/dx.doi.org/10.1108/00242530610706761.

P.A. Lissner (2007). Chi-thinking: Chiasmus and Cognition. (Order No. 3297307, University of Maryland, College Park). ProQuest Disserations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US12/28036 dated Sep. 10, 2013; 5 pages.

International Preliminary Examination Report for International Application No. PCT/US12/28008 dated Sep. 10, 2013; 7 pages.

International Preliminary Examination Report for International Application No. PCT/US12/27912 dated Sep. 10, 2013; 6 pages.

International Search Report and Written Opinion for International Application No. PCT/US12/27890 dated Feb. 5, 2013.

U.S. International Searching Authority. PCT International Search Report and Written Opinion dated Sep. 24, 2012. PCT International Application No. PCT/US12/48697. Name of Applicant: Bank of America Corporation. English Language. 14 pages.

International Searching Authority. PCT International Search Report and Written Opinion dated May 28, 2012. PCT International Application No. PCT/US12/28036. Name of Applicant: Bank of America Corporation. English Language. 11 pages.

International Searching Authority. PCT International Search Report and Written Opinion dated May 22, 2012. PCT International Application No. PCT/US12/28008. Name of Applicant: Bank of America Corporation. English Language. 13 pages.

International Searching Authority. PCT International Search Report and Written Opinion dated Jun. 8, 2012. PCT International Application No. PCT/US2012/027912. Name of Applicant: Bank of America Corporation. English Language. 12 pages.

International Searching Authority. PCT International Search Report and Written Opinion dated Jun. 14, 2012. PCT International Application No. PCT/US12/27892. Name of Applicant: Bank of America Corporation. English Language. 19 pages.

A. Kaklauskas and M. Gikys, Increasing Efficiency of Multiple Listing Service Systems Applying Web-Based Decision Support System for Real Estate, Journal of Civil Engineering and Management, 2005, vol. XI, No. 2, pp. 91-97, http://citeseerx.ist.psu.edu/viewdoc/summary?doi=10.1.1.125.7011.

(56) References Cited

OTHER PUBLICATIONS

Xun Luo, The Cloud-Mobile Convergence Paradigm for Augmented Reality, http://cdn.intechopen.com/pdfs/24824/InTech-The_cloud_mobile_convergence_paradigm_for_augmented_reality.pdf, pp. 34-59.

"Bank of America Announces New Online Banking Alerts to Increase Security and Help Customers Monitor Their Accounts", PR Newswire [New York], Mar. 8, 2006, pp. 1-3.

Anonymous, "NewsRx: Intuit Inc. ; The New Free Quicken Online: the Web's First Forward-Looking Personal Finance Service", Science Letter, Dec. 23, 2008, pp. 1-2.

"Landware: Pocket Quicken: Now its easy to keep your financial information complete, accurate and up-to-date wherever you go", http://www.landware.com/pocketquicken/moreinfo.html, copyright 1995-2007, pp. 1-4.

* cited by examiner

SYSTEM FOR TRACKING RESOURCE ALLOCATION/USAGE

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and high-resolution video cameras. As the hardware capabilities of such mobile devices have increased, so too have the applications (i.e., software) that rely on the hardware advances. One such example of innovative software is a category known as augmented reality (AR). There is a need for a system to take advantage of the AR capability to retrieve information in real-time by tracking resource allocation and usage.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for tracking resource allocation/usage across a dispersed Internet protocol capable network connecting devices electrically attached to the network is presented. The system comprises at least one memory storing the augmented reality application; at least one processing device operatively coupled to the memory device, wherein the processing device is configured to execute computer-readable program code to: initiate a control path connection on a network layer between one or more computing devices attached to a dispersed network and at least one distributed server; receive, from a first user computing device, a first user request for authorization to access at least one of the one or more computing devices; initiate the augmented reality application for display on the at least one of the one or more computing devices based on at least determining that the user has authorization to access the at least one of the one or more computing devices; reconfigure, via the augmented reality application, a display device associated with the first user computing device to emulate a content displayed on a display device associated with at least one of the one or more computing devices on the display device of the first user computing device; retrieve, using the first user computing device, information from the content; process, using the first computing device, the retrieved information; and transmit control signals configured to cause the display device associated with at least one of the one or more computing devices and/or the display device of the first user computing device to display the processed information.

In some embodiments, the module is further configured to: access one or more devices associated with the at least one of the one or more computing devices, wherein the one or more devices comprises a microphone, an image capturing device, and a speaker based on at least determining that the user has authorization to access the at least one of the one or more computing devices.

In some embodiments, the module is further configured to: initiate the augmented reality application for display on the at least one of the one or more computing devices, wherein initiating further enables a data path connection between the first user computing device and the at least one of the one or more computing devices, thereby connecting the first user computing device to a dispersed network.

In some embodiments, the module is further configured to: receive content from a plurality of computing devices connected to the dispersed network based on at least determining that the user has authorization to access the plurality of the computing devices; and dynamically configure the display device associated with the first user computing device to display each content received from the plurality of computing devices simultaneously.

In some embodiments, the module is further configured to: receive, via a second user computing device, a second user request for authorization to access the content transmitted between the at least one of the one or more computing devices and the first user computing device; and determine an access level associated with the second user computing device, wherein the access level defines one or more actions executable by the second user computing device to cause a change in the content displayed.

In some embodiments, the module is further configured to: reconfigure, via the augmented reality application, a display device associated with the second user computing device to emulate the content displayed on the display device associated with at least one of the one or more computing devices and/or the display device of the first user computing device on the display device of the second user computing device based on at least the access level associated with the second user computing device.

In some embodiments, the content comprises a real-time video stream of a surrounding environment captured continuously by the at least one of the one or more computing devices using an image capturing device associated with the at least one of the one or more computing devices.

In some embodiments, the module is further configured to: determine that the at least one of the one or more computing devices and/or the first user computing device is associated with at least one trigger event, wherein the triggering event comprises: (i) the at least one of the one or more computing devices being exposed a predetermined low levels of illumination for the first predetermined extended period of time, (ii) the at least one of the one or more computing devices being stationary for a second predetermined extended period of time, or (iii) a power source of the at least one of the one or more computing devices being associated with predetermined low levels.

In some embodiments, the module is further configured to: disengage the emulation of the content displayed on the display device associated with at least one of the one or more computing devices on the display device of the first user computing device based on at least determining that the at least one of the one or more computing devices and/or the first user computing device is associated with at least one trigger event.

In some embodiments, the module is further configured to: re-engaging, automatically, the emulation of the content displayed on the display device associated with at least one of the one or more computing devices on the display device of the first user computing device based on at least determining that the at least one of the one or more computing devices and/or the first user computing device is not associated with at least one trigger event In another aspect, a computerized method for tracking resource allocation/usage across a dispersed Internet protocol capable network connecting devices electrically attached to the network is presented. The method comprising: initiating, via a computing device processor, a control path connection on a network layer between one or more computing devices attached to a dispersed network and at least one distributed server; receiving, from a first user computing device, a first user request for authorization to access at least one of the one or more computing devices; initiating, via a computing device processor, the augmented reality application for display on the at least one of the one or more computing devices based on at least determining that the user has authorization to access the at least one of the one or more computing devices; reconfiguring, via the augmented reality application, a display device associated with the first user computing device to emulate a content displayed on a display device associated with at least one of the one or more computing devices on the display device of the first user computing device; retrieving, using the first user computing device, information from the content; processing, using the first computing device, the retrieved information; and transmitting, via a computing device processor, control signals configured to cause the display device associated with at least one of the one or more computing devices and/or the display device of the first user computing device to display the processed information.

In yet another aspect, a computer program product for tracking resource allocation/usage across a dispersed Internet protocol capable network connecting devices electrically attached to the network is presented. The computer program product comprising a non-transitory computer-readable medium comprising code causing a first apparatus to: initiate a control path connection on a network layer between one or more computing devices attached to a dispersed network and at least one distributed server; receive, from a first user computing device, a first user request for authorization to access at least one of the one or more computing devices; initiate the augmented reality application for display on the at least one of the one or more computing devices based on at least determining that the user has authorization to access the at least one of the one or more computing devices; reconfigure, via the augmented reality application, a display device associated with the first user computing device to emulate a content displayed on a display device associated with at least one of the one or more computing devices on the display device of the first user computing device; retrieve, using the first user computing device, information from the content; process, using the first computing device, the retrieved information; and transmit control signals configured to cause the display device associated with at least one of the one or more computing devices and/or the display device of the first user computing device to display the processed information.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. For clarity, non-essential elements may have been omitted from some of the drawing.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

As used herein, the term "resource" will generally refer to objects, products, goods, commodities, services, and the like, and/or the ability and opportunity to view, access and use the same. Some example implementations herein contemplate property held by a user, including property that is stored and/or maintained by a third party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as distinct pieces of furniture, equipment, or other valuables, or the like. Similarly, "funds" or "available balance" refer to types of resources. For example, the term "fund" may be used to refer to one or more sets of monetary resources available to a user, and may also be referred to as an available balance, a collected balance, good funds, and usable funds.

In accordance with embodiments of the invention, the terms "financial institution" and "financial entity" or "entity" may include any organization that processes financial transactions including, but not limited to, banks, credit unions, savings and loan associations, investment companies, stock brokerages, asset management firms, insurance companies and the like.

Many of the example embodiments and implementations described herein contemplate interactions engaged in by a resource user with a computing device (e.g., a mobile device) and/or one or more resource access communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In some example implementations, a resource access communication device is capable of interacting with a user in the sense that it can detect and parse audible statements from a user (including but not limited to spoken commands, spoken questions, and other user speech) and/or written content from a user (including but not limited to text input by a user and/or other written commands or statements), and responding to the user in the form of performing transactions, transmitting credentials, establishing communication channels, prompting the user to perform one or more actions, scheduling meetings with personnel associated with one or more resources, and the like.

Many example implementations are particularly directed to a user's interaction with resources associated with the user and stored or otherwise associated with a third party financial institution. In some such implementations, a resource access communication device, as either a stand-alone device or one integrated into a user computing device, is capable of interacting with a banking application to facilitate the efficient and effective access, monitoring, deployment, and accumulation of resources by the user. For example, a resource access communication device that is capable of detecting and processing voice commands may be used by a user to translate statements made by the user, into operative transactions, such as the satisfaction of obligations, transfers of resources, subscription to certain products and/or services, responding to offers, and the like. Similarly, a resource access communication device that is capable of detecting and processing written statements from a user, such as text messages or other written messages may likewise be used to effectuate transactions and operations associated with resources and otherwise respond to user input.

Some example implementations contemplate resource access communication devices that are able to detect, parse, and respond to predetermined command words or phrases, colloquial and/or non-specific language, and/or other natural language in a manner that allows a user to effectively monitor and manage their resource usage. For example, such a resource access communication device may be capable of recognizing a statements such as "check my transaction history", "pay all outstanding obligations", or other similar declarative commands, and, in response to such commands, perform the requested operation, such as providing a copy of the user's transaction history (or a portion thereof, as requested), or such as initiating transactions to pay any bills or other obligations that have not yet been paid. In another example, a resource access communication device may be able to respond to questions such as "has my paycheck been deposited", "am I on track to retire", "tell me about this transaction I don't recognize" by requesting and receiving the appropriate data set and/or message information, and conveying it to the user. In another example, a resource access communication device may be configured to perform operations based on other input received from the user and/or information received from one or more third parties or other sources. In one such example, a user may articulate that certain items should be added to a grocery or other shopping list, that one or more goods or services are necessary for a home or vehicle, or the like. In response to the user input, the resource access communication device may locate and/or compile offers associated with the goods, services, and/or other products associated with the statements made by the user, and convey those offers and/or other information to the user.

While some example implementations contemplate a resource access communication device and/or module that is integrated into a user's mobile device, some example implementations contemplate one or more stand-alone resource access communication devices and/or one or more secondary communications devices. Some users may derive particularized benefits by having secondary communication devices deployed in advantageous positions around a home, workspace, or other locations, wherein such secondary communication devices are capable of communicating user input to a resource access communication device and relaying information back to the user. For example, a user may opt to position one secondary communication device in a kitchen, and recite items that may be needed for the completion of a particular recipe or a grocery list. The secondary communication device can in turn relay the information to a resource access communication device for further processing, and relay back to the user any response from the resource access communication device. Similarly, a user may opt to position a secondary communication device near where the user often processes mail or other correspondence, such that the user can provide instructions to pay bills or otherwise interact with service providers, entities associated with offers received by the user, and other entities associated with correspondence received by the user. Those skilled in the art will appreciate that a user may opt to position such secondary communication devices in any location where it may be advantageous to be able to issue speaking and/or written commands or statements to provide information about potential resource uses, initiate transactions, and/or otherwise monitor the status and use of resources.

Figure 1:
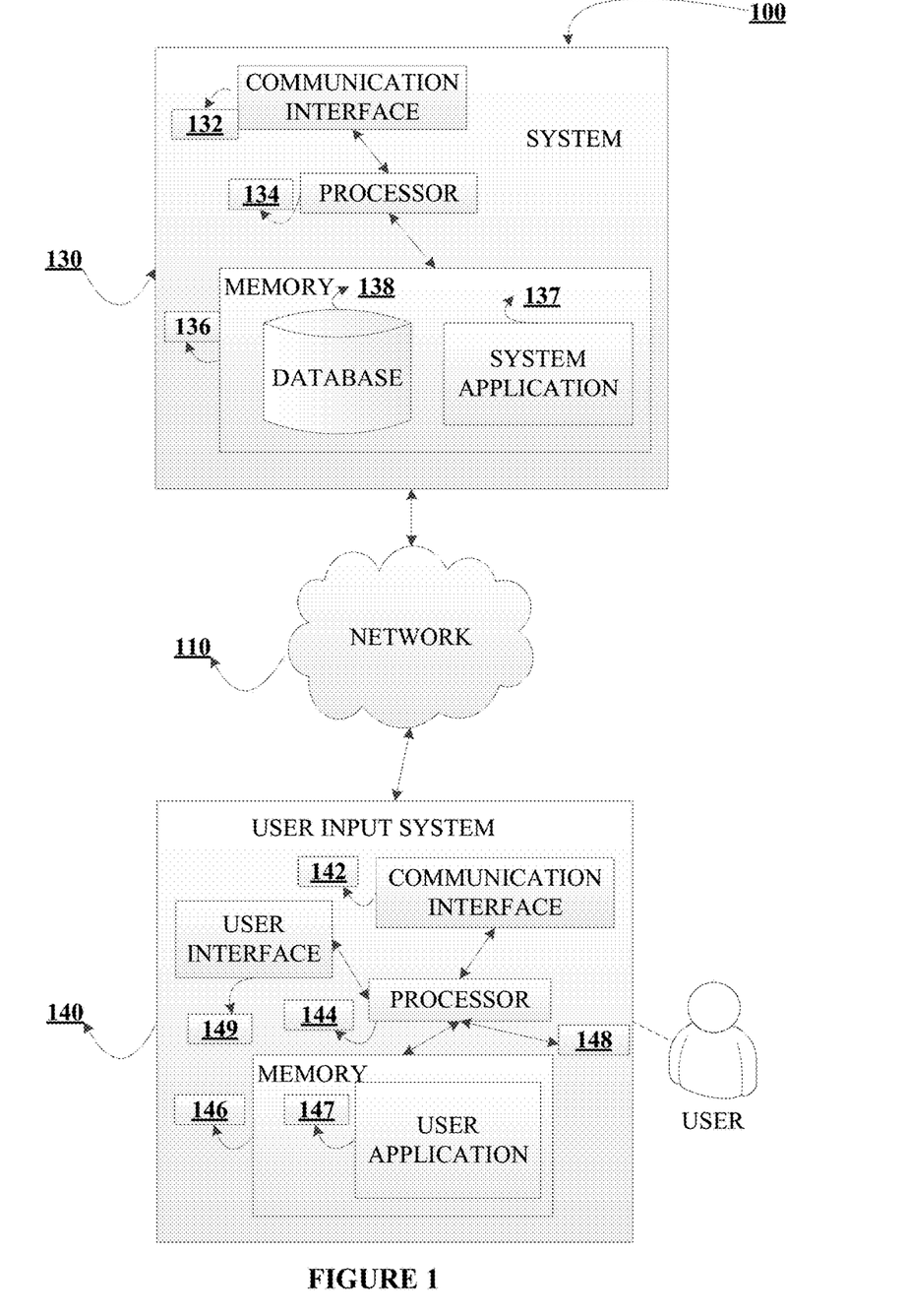
FIG. 1 presents an exemplary block diagram of the system environment for implementing the process flows described herein in accordance with embodiments of the present invention.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

Figure 2:
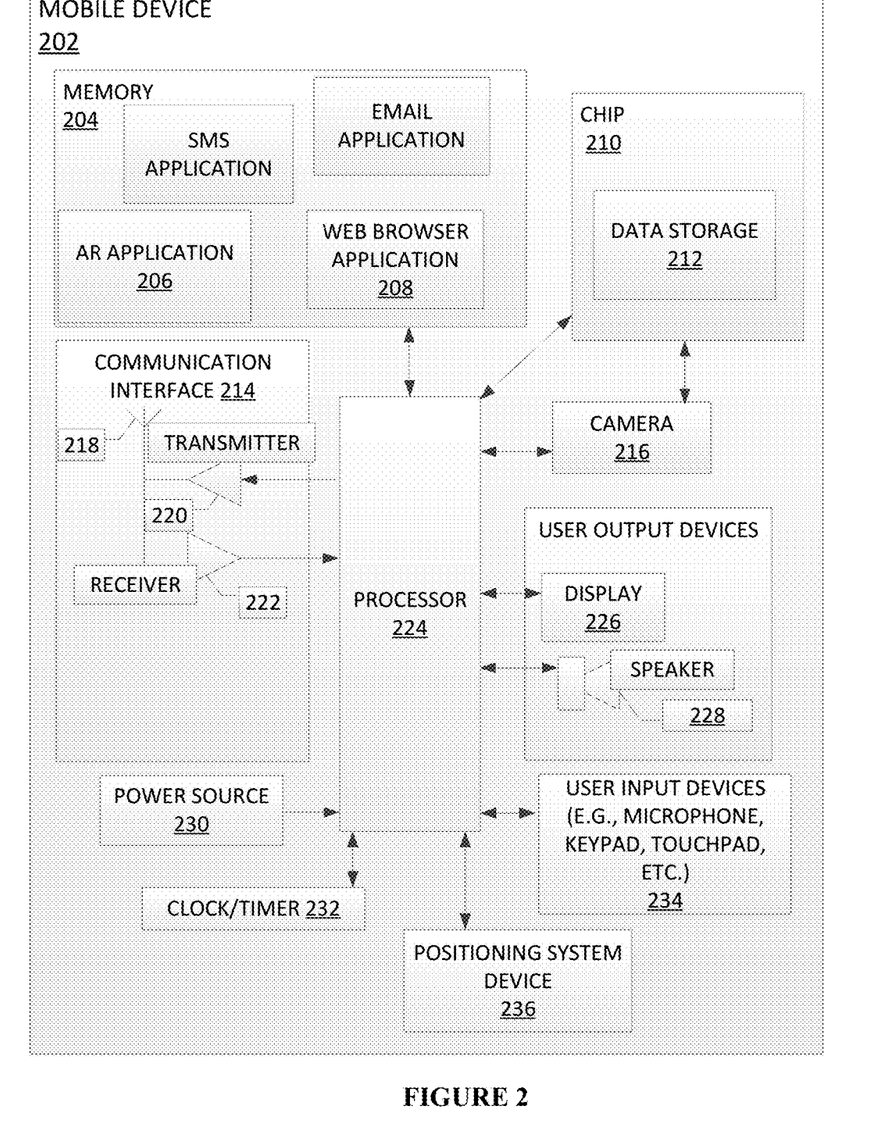
FIG. 2 illustrates a user input system (e.g., mobile device) for tracking resource allocation/usage across a dispersed Internet protocol capable network connecting devices electrically attached to the network.

FIG. 2 illustrates a user input system (e.g., mobile device) for tracking resource allocation/usage across a dispersed Internet protocol capable network connecting devices electrically attached to the network 200. The mobile device may be configured to execute both object recognition and AR functionality. The embodiment present in FIG. 2 is merely an example embodiment. Other embodiments of the mobile device 202 may include other components that are not discussed here. In some embodiments, the mobile device 202 may be configured to provide or participate in AR functionality. Mobile device 202 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 202 may generally include a processor 224 communicably coupled to such devices as a memory 204, user output devices 440B, user input devices 234, a network interface 214, a power source 230, a clock or other timer 232, a camera 216, and positioning system device 236. In some embodiments, camera 216 may be a digital camera configured to capture still images. In other embodiments, camera 216 may be a digital video recorder. In other embodiments, camera 216 may embody both digital camera functionality and digital video functionality. The processor 224, and other processors described herein, may generally include circuitry for implementing communication and/or logic functions of the mobile device 202. For example, the processor 224 may include a digital signal processor device, a microprocessor device, and various analog to digital converters, digital to analog converters, and/or other support circuits. Control and signal processing functions of the mobile device 202 may be allocated between these devices according to their respective capabilities. The processor 224 thus may also include the functionality to encode and interleave messages and data prior to modulation and transmission. The processor 224 may additionally include an internal data modem. Further, the processor 224 may include functionality to operate one or more software programs or applications, which may be stored in the memory 204. For example, the processor 224 may be capable of operating a connectivity program, such as a web browser application 208. The web browser application 208 may then allow the mobile device 202 to transmit and receive web content, such as, for example, location-based content and/or other web page content, according to a Wireless Application Protocol (WAP), Hypertext Transfer Protocol (HTTP), and/or the like.

In some embodiments, one or more components of the mobile device 202 may be performed by stand-alone devices that together comprise a system. For instance, the system includes a first separate stand-alone device that may include a camera 216, a second separate stand-alone device that may include user output devices 440B (including a display 226), a third separate stand-alone device that may include user input devices 234, a fourth separate stand-alone device that may include a communication interface 214, a fifth separate stand-alone device that may include one or more of the other remaining components of the mobile device 202 (e.g., the processor 224, the memory 204, the power source 230, the chip 210, etc.). Each of these separate stand-alone devices may be temporarily or permanently affixed to different parts of a moving vehicle. For instance, a stand-alone device that includes the camera 216 may be positioned (e.g., facing the outside of the vehicle) such that the camera 216 captures images outside the vehicle. In some embodiments, the camera 216 is an omnidirectional camera that may have the ability to capture a 360 degree field of view in a horizontal plane or a field of view that covers almost an entire sphere. In some embodiments, a stand-alone device that includes the display 226 (or other output devices 440B) may be situated in an interior portion of the vehicle, such that a user of the system situated in the interior portion of the moving vehicle can view one or more images that are captured by the camera 216. In some embodiments, a stand-alone device that includes the input devices 234 may be situated in the interior portion of the vehicle such that a user of the system can enter input to the system (e.g., enter input that directs the camera 216 to capture an image). In some embodiments, a stand-alone device that includes the processor 224 and the memory 204 may be located in the interior portion of the vehicle. In some embodiments, one or more stand-alone devices of the system may be located at a remote location away from the vehicle. For instance, a stand-alone device that includes the processor 224 and the memory 204 may be located at a remote location. As a further instance, a stand-alone device that performs AR functionality may be located at a remote location. As an even further instance, a stand-alone device that includes the display 226 (or other output devices 440B) may be situated at a remote location such that a user of the system can view, at the remote location, one or more images that are captured by the camera 216. As an even further instance, a stand-alone device that includes the input devices 234 may be situated at a remote location such that a user of the system can enter, at the remote location, input to the system (e.g., enter input that directs the camera 216 to capture an image).

The processor 224 may also be capable of operating applications, such as an AR application 206. The AR application 206 may be downloaded from a server and stored in the memory 204 of the mobile device 202. In other embodiments, AR application 206 may be pre-installed on memory 204. AR application may include computer-readable code that when executed by processor 224 may provide the AR functionality described herein with regards to mobile device 202. In some embodiments, the processor 224 may also be capable of operating one or more applications, such as one or more applications functioning as an artificial intelligence ("AI") engine. The processor 224 may recognize objects that it has identified in prior uses by way of the AI engine. In this way, the processor 224 may recognize specific objects and/or classes of objects, and store information related to the recognized objects in one or more memories and/or databases discussed herein.

In some embodiments, the mobile device may have a separate chip 210 that is in communication with the processor 224 and the camera 216. In some embodiments, the chip 210 may be able to store the AR application 206. In some embodiments, the chip 210 may also include a data storage 212. The data storage 212 may store information associated with an image captured by the camera 216. In some embodiments, the chip 210 may communicate with the AR apparatus 100 of FIG. 1.

The chip 210 (or integrated circuit) may include the necessary circuitry to provide the object recognition functionality to the mobile device 202. Generally, the chip 210 will include data storage 212 which may include data associated with the objects within a video stream. The chip 210 and/or data storage 212 may be an integrated circuit, a microprocessor, a system-on-a-integrated circuit, a microcontroller, or the like. As discussed above, in one embodiment, the chip 210 may provide the functionality to the mobile device 202.

Of note, while FIG. 2 illustrates the chip 210 as a separate and distinct element within the mobile device 202, it will be apparent to those skilled in the art that the object recognition functionality of chip 210 may be incorporated within other elements in the mobile device 202. For instance, the functionality of the chip 210 may be incorporated within the mobile device memory 204 and/or processor 224. In a particular embodiment, the functionality of the chip 210 is incorporated in an element within the mobile device 202 that provides object recognition capabilities to the mobile device 202. Still further, the chip 210 functionality may be included in a removable storage device such as an SD card or the like.

The communication interface 214 may also include an interface in order to allow a user to execute some or all of the above-described processes with respect to the one or more applications and/or the chip 210. The interface may have access to the hardware, e.g., the transceiver, and software accessible to the communication interface 214. Furthermore, the interface may have the ability to connect to and communicate with an external data storage on a separate system within the network as a means of recognizing the object(s) in the video stream.

The processor 224 may be configured to use the communication interface 214 to communicate with one or more other devices on a network. In this regard, the communication interface 214 may include an antenna 218 operatively coupled to a transmitter 220 and a receiver 222 (together a "transceiver"). The processor 224 may be configured to provide signals to and receive signals from the transmitter 220 and receiver 222, respectively. The signals may include signaling information in accordance with the air interface standard of the applicable cellular system of the wireless telephone network that may be part of the network. In this regard, the mobile device 202 may be configured to operate with one or more air interface standards, communication protocols, modulation types, and access types. By way of illustration, the mobile device 202 may be configured to operate in accordance with any of a number of first, second, third, and/or fourth-generation communication protocols and/or the like. For example, the mobile device 202 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 202 may also be configured to operate in accordance with non-cellular communication mechanisms, such as via a WLAN, WAN, GAN, the Internet or other communication/data networks.

As described above, the mobile device 202 may have a user interface that includes user output devices 440B and/or user input devices 234. The user output devices 440B may include a display 226 (e.g., a liquid crystal display (LCD) or the like) and a speaker 228 or other audio device, which are operatively coupled to the processor 224. The user input devices 234, which may allow the mobile device 202 to receive data from a user 310, may include any of a number of devices allowing the mobile device 202 to receive data from a user, such as a keypad, keyboard, touch-screen, touchpad, microphone, mouse, joystick, other pointer device, button, soft key, and/or other input device(s).

The mobile device 202 may further include a power source 230. Generally, the power source 230 is a device that supplies electrical energy to an electrical load. In one embodiment, power source 230 may convert a form of energy such as solar energy, chemical energy, mechanical energy, etc. to electrical energy. Generally, the power source 230 in a mobile device 202 may be a battery, such as a lithium battery, a nickel-metal hydride battery, or the like, that is used for powering various circuits, e.g., the transceiver circuit, and other devices that are used to operate the mobile device 202. Alternatively, the power source 230 may be a power adapter that can connect a power supply from a power outlet to the mobile device 202. In such embodiments, a power adapter may be classified as a power source "in" the mobile device.

The mobile device 202 may also include a memory 204 operatively coupled to the processor 224. As used herein, memory may include any computer readable medium configured to store data, code, or other information. The memory 204 may include volatile memory, such as volatile Random Access Memory (RAM) including a cache area for the temporary storage of data. The memory 204 may also include non-volatile memory, which can be embedded and/or may be removable. The non-volatile memory may additionally or alternatively include an electrically erasable programmable read-only memory (EEPROM), flash memory or the like. The memory may store any one or more of pieces of information and data used by the mobile device in which it resides to implement the functions of that mobile device. In this regard, the system may dynamically utilize the volatile memory over the non-volatile memory by storing multiple pieces of information in the volatile memory, thereby reducing the load on the mobile device processor and increasing the processing speed.

The memory 204 may store any of a number of applications or programs which include computer-executable instructions/code executed by the processor 224 to implement the functions of the mobile device 202 described herein. For example, the memory 204 may include such applications as an AR presentation application, a web browser application, an SMS application, an object recognition application, an email application, etc. Although not depicted in FIG. 2, in some embodiments of the invention, memory 204 may store all or part of AR System Application 339 and Identifying Data 338.

As explained earlier, the mobile device 202 may also include a positioning system device 236. In some embodiments, the positioning system device 236 may include a global positioning system (GPS) transceiver that communicates with a GPS satellite. An apparatus (such as the AR apparatus 330 or the mobile device 202) may be able to receive GPS coordinates associated with the mobile device by communicating with the GPS satellite. In some embodiments, the positioning system device 236 is at least partially made up of an antenna, a transmitter, and a receiver. In some embodiments, triangulation of cellular signals may be used to identify the approximate location of the mobile device 202. For instance, an apparatus may be able to identify a cell site, i.e., cell tower that is located close to or closest to the mobile device 202. In still other embodiments, the positioning system device 236 includes a proximity sensor or transmitter, such as an RFID tag, that can sense or be sensed by devices known to be located proximate a merchant or other location to determine that the mobile device 202 is located proximate these devices. In still other embodiments where the mobile device 202 is on a network, an apparatus may identify or receive a network address associated with the mobile device 202. In some embodiments, an apparatus may receive the network address by either 'pinging' the mobile device 202 or some other system on the network that retains information about one or more devices on the network. In some embodiments, the network address is an Internet Protocol (IP) address.

Figure 3:
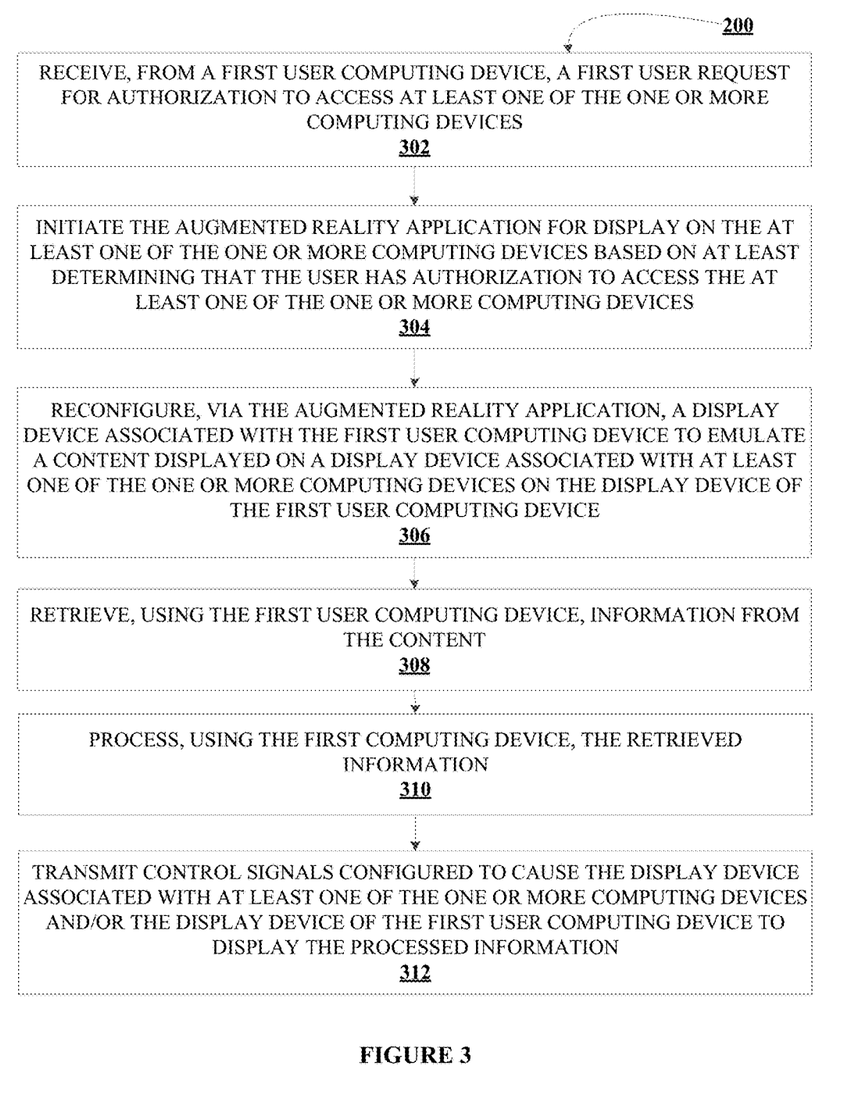
FIG. 3 illustrates a flow diagram for tracking resource allocation/usage across a dispersed Internet protocol capable network connecting devices electrically attached to the network, in accordance with an embodiment of the invention

FIG. 3 illustrates a flow diagram for tracking resource allocation/usage across a dispersed Internet protocol capable network connecting devices electrically attached to the network 300, in accordance with an embodiment of the invention. As shown in block 302, the system may be configured to receive, from a first user computing device, a first user request for authorization to access at least one of the one or more computing devices. In this regard, the system may be configured to initiate a control path connection on a network layer between one or more computing devices attached to a dispersed network and at least one distributed server. For purposes of the invention, the first user computing device and/or the one or more computing devices are mobile devices.

Next, as shown in block 304, the system may be configured to initiate the augmented reality application for display on the at least one of the one or more computing devices based on at least determining that the user has authorization to access the at least one of the one or more computing devices. In some embodiments, the system may be configured to access one or more devices associated with the at least one of the one or more computing devices based on at least determining that the user has authorization to access the at least one of the one or more computing devices. In this regard, the one or more devices may include, but is not limited to a microphone, an image capturing device, and a speaker. In some embodiments, the system may be configured to initiate the augmented reality application for display on the at least one of the one or more computing devices thereby enabling a data path connection between the first user computing device and the at least one of the one or more computing devices to connect the first user computing device to a dispersed network.

Next, as shown in block 306, the system may be configured to reconfigure, via the augmented reality application, a display device associated with the first user computing device to emulate a content displayed on a display device associated with at least one of the one or more computing devices on the display device of the first user computing device. The content is emulated by duplicating the display and/or behavior of the one or more computing devices using software programs on a first computing device. In order to do so, the one or more computing devices and/or the first computing device comprises an emulating device that is designed by taking into account the internal architecture of the one or more computing devices. In some embodiments, the system may be configured to receive content from a plurality of computing devices connected to the dispersed network based on at least determining that the user has authorization to access the plurality of the computing devices. In response, the system may be configured to dynamically configure the display device associated with the first user computing device to display each content received from the plurality of computing devices simultaneously.

For purposes of the invention, the content displayed on the display device associated with at least one of the one or more computing devices includes content captured by and/or stored on an image capturing device associated with the one or more computing devices. In this regard, the content may include at least an image and/or a video stream. In some embodiments, the content may be pre-recorded and stored on the memory device associated with the one or more computing devices. In this regard, when the content is accessed by the first user computing device, the pre-recorded image and/or video stream is moved temporarily from the non-volatile memory of the one or more computing devices to the volatile memory/cache of the one or more computing devices for faster retrieval and processing. In some embodiments, the content may be captured in real-time by the image capturing devices associated with the one or more computing devices and transmit the content, via a communication channel capable of reliably transmitting the content in real-time.

Next, as shown in block 308, the system may be configured to retrieve, using the first user computing device, information from the content. In some embodiments, the information associated with an image includes one or more objects (e.g., products, locations, businesses, etc.) depicted in the image. In one aspect, the one or more objects captured may be used to determine additional information associated with the objects themselves and/or the environment in which the one or more objects were captured. For example, the system described herein may be used by a realtor and/or a potential home owner (hereinafter collectively referred to as a "user" for purposes of this example) to capture one or more aspects of a property. The one or more aspects may be household objects such as a mirror, light fixtures, bath fixtures, electrical outlets, ceiling fans, windows, and/or the like. In doing so, the system may be configured to determine that the environment involving objects such as a mirror, bath fixtures, and/or electrical outlets may be a bathroom. In this way, the present invention provides the functional benefit of capturing one or more aspects of the property as a virtual reality experience and helps the user navigate elaborate processes such as a mortgage or loan process, inspection process, and/or the like involved in purchasing the property. In some embodiments, the information retrieved from the one or more objects directly correspond to one or more requirements associated with a particular process such as a mortgage process. Additionally, the present invention may be used to determine other property information/requirement based on experiencing the virtual reality tour of the property, such as types of insurance required to adequately protect the property.

Next, as shown in block 310, the system may be configured to process, using the first computing device, the retrieved information. In some embodiments, processing the information may include identifying dimensions associated with one or more objects captured by one or more computing devices. In this regard, in one aspect, the system may be configured to capture the geometric figures and the images, or mappings that result from projecting the one or more objects onto another surface. In another aspect, the system may be configured to employ one or more algorithms such as the scale-invariant feature transform (SIFT) to detect and describe local features in the one or more objects and/or the content itself. In yet another aspect, the system may be configured to implement one or more filtering techniques such as the Kalman filter to track one or more objects in real-time. In some embodiments, the system may be configured to implement a combination of the one or more techniques discussed herein and/or one or more similar techniques to retrieve dimensional information from the content captured. Continuing with the previous example, the system may be configured to determine dimension information associated with each room within the property. In this regard, the system may use one or more publicly available records indicating a floor plan and/or a layout of the property in conjunction with the content captured to determine dimension information. In some other embodiments, the system may be configured to use only the information retrieved from the content to determine dimension information of the property.

In some embodiments, the system may be configured to present an indicator associated with the information retrieved from the content on the display of the one or more computing devices and/or the first user computing device. In one aspect, the indicator associated with the information generally means an indicator, such as a tab, link, graphic or image, that is presented on the display of the one or more computing devices and/or the first user computing device that is associated with the information retrieved from the content. In some embodiments, the indicator may include a line spanning the feature and a numerical value indicating the dimensions of the feature in units. In one aspect, the units of the dimension are configurable by the user. The indicator may be any color and may be in any shape. In embodiments where all or part of the indicator is a line, the line may be solid, dashed, dotted or any combination thereof. In one aspect, the indicator may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the indicator may be audio and the mobile device may be capable of utilizing audio recognition to identify words or unique sounds broadcast. The indicator may be any size, shape, etc. Indeed, in some embodiments, the indicator may be very small relative to the object such as the alpha-numeric characters that identify the name or model of an object, whereas, in other embodiments, the indicator is the entire object such as the unique shape, size, structure, etc. In embodiments in which the indicator provides an interactive tab, link, graphic or image to the user, the user may select the indicator by any conventional means for interaction with the one or more computing devices and/or the first user computing device. For instance, in some embodiments, the user may utilize an input device, such as a keyboard to highlight and select the indicator in order to retrieve the information. In some embodiments, the user may be able to select the indicator by the touch screen display of one or more computing devices and/or the first user computing device. Continuing with the previous example, the system may automatically determine objects such as light fixtures and present an indicator indicating the same. In one aspect, the system may be configured to receive user input to accurately display the correct information via the indicator.

Furthermore, the indicator may be displayed at any side on the one or more computing devices and/or the first user computing device's display. The indicator may be small enough that it is positioned on, next to or around an image of an object. In some embodiments, the image of the object may remain discernable next to the indicator. In some embodiments, the indicator may be semi-transparent such that the image of the object remains discernable behind the indicator. In some embodiments, the image of the object may be discernable because the indicator forms an outline of the object. In yet some other embodiments, the indicator may be large enough to completely cover the object depicted on the mobile device display. Indeed, in some embodiments, the indicator may cover a majority or the entirety of the mobile device display. In some embodiments, the system may be configured to present the indicator by superimposing the indicator over a real-time video stream that is captured by the mobile device. This real-time video stream may depict the object. In some embodiments of the invention, the indicator may only be superimposed over real-time video if the real-time video stream still depicts the object.

Next, as shown in block 312, the system may be configured to transmit control signals configured to cause the display device associated with at least one of the one or more computing devices and/or the display device of the first user computing device to display the processed information. Continuing from the previous example, the one or more computing devices may include a mobile device used by the realtor when providing a virtual reality tour experience. In this scenario, the first user computing device may be a mobile device used by a potential home owner. In some embodiments, the potential home owner may receive one or more video streams from one or more realtors capturing one or more different properties and/or one or more different parts of the same property (e.g., lawn and living room) in tandem. In another example, the one or more computing devices may be a mobile device used by the user (realtor and/or the potential home owner). In this scenario, the first user computing device may be a computing device associated with a loan officer associated with the financial institution.

In some embodiments, the present invention may provide the functional benefit of allowing property inspectors to use the system described herein to inspect the property via the virtual reality platform and create a check-list of items that require further inspection. In this regard, the system may be configured to enable the inspector to create check-points with optional notes and geo-tags when generating the check-lists in such a way that when the check-points and/or notes are accessed at a later time, the system may be configured to replay the portion of the virtual reality experience of the inspector to validate the inspectors decisions.

In some embodiments, the system may be configured to receive, via a second user computing device, a second user request for authorization to access the content transmitted between the at least one of the one or more computing devices and the first user computing device. In doing so, the system may determine an access level associated with the second user computing device to determine one or more actions executable by the second user computing device to cause a change in the content displayed on the one or more computing devices and/or the first user computing device. In response, the system may be configured to reconfigure, via the augmented reality application, a display device associated with the second user computing device to emulate the content displayed on the display device associated with at least one of the one or more computing devices and/or the display device of the first user computing device on the display device of the second user computing device based on at least the access level associated with the second user computing device. Continuing with the previous example, the second user may be a loan officer, a home inspector, or the like with access to view the video stream relayed to the potential home owner by the realtor. In this way, the potential home owner and the realtor may be involved in the process even if the potential home owner and/or the loan officer and/or the home inspector are in geographically different locations.

In some embodiments, the system may be configured to enable the user to overlay scalable imaged stored on the memory of the first user computing device or captured by the image capturing device associated with the first computing device in real-time, on the received content. For example, a potential home owner/renter may tour a property using the virtual reality application and in real-time overlay scalable images of furniture on the content received to determine whether the home owner/renter's furniture fits a property. In some other embodiments, the system may be configured to enable the user to determine one or more cost estimates associated with renovation or remodeling a property via the virtual reality experience.

Additionally, it will be appreciated that one or more computing devices may be associated with an "always on" feature in which video is continuously captured may consume the power source associated with the one or more computing devices more quickly. Thus, in some embodiments, the "always on" feature may disengage if a determined event occurs such as low power source, low levels of light for an extended period of time (e.g., such as if the mobile device is in a user's pocket obstructing a clear view of the environment from the mobile device), if the one or more computing devices remains stationary (thus receiving the same video stream) for an extended period of time, the user sets a certain time of day to disengage, etc. Conversely, if the "always on" feature is disengaged due to the occurrence of such an event, the user may opt for the "always on" feature to re-engage after the duration of the disengaging event (e.g., power source is re-charged, light levels are increased, etc.).

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for tracking resource allocation/usage across a dispersed Internet protocol capable network connecting devices electrically attached to the network, the system comprising:

at least one memory storing an augmented reality application;

at least one processing device operatively coupled to the memory device, wherein the at least one processing device is configured to execute computer-readable program code to:

initiate a control path connection on a network layer between one or more computing devices attached to a dispersed network and at least one distributed server;

receive, from a first user computing device, a first user request for authorization to access at least one of the one or more computing devices;

initiate the augmented reality application for display on the at least one of the one or more computing devices based on at least determining that the user has authorization to access the at least one of the one or more computing devices;

reconfigure, via the augmented reality application and using one or more software applications stored on the first computing device, a display device associated with the first user computing device to emulate a content displayed on a display device associated with at least one of the one or more computing devices on the display device of the first user computing device, wherein emulating further comprises duplicating a content displayed on the display device associated with at least one of the one or more computing devices, and a behavior of at least one of the one or more computing devices on the first user computing device;

retrieve, using the first user computing device, information from the content, wherein the information comprises one or more objects;

process, using the first computing device, the retrieved information, wherein processing further comprises:
extracting one or more features from the one or more objects; and
identifying the one or more objects based on at least the extracted features;

determine dimensional information associated with the one or more objects by capturing one or more geometric figures and images resulting from projecting the one or more objects on to another surface;

determine at least one surrounding environment based on at least identifying the one or more objects;

determine dimensional information associated with the at least one surrounding environment;

transmit control signals configured to cause the display device associated with at least one of the one or more computing devices and/or the display device of the first user computing device to display the one or more identified objects and the at least one surrounding environment associated with the one or more identified objects;

determine that the at least one of the one or more computing devices and/or the first user computing device is associated with at least one trigger event, wherein the triggering event comprises: (i) the at least one of the one or more computing devices being exposed a predetermined low levels of illumination for a first predetermined extended period of time, (ii) the at least one of the one or more computing devices being stationary for a second predetermined extended period of time, or (iii) a power source of the at least one of the one or more computing devices being associated with predetermined low levels; and disengage the emulation of the content displayed on the display device associated with at least one of the one or more computing devices on the display device of the first user computing device based on at least determining that the at least one of the one or more computing devices and/or the first user computing device is associated with at least one trigger event.

2. The system of claim 1, wherein the at least one processing device is further configured to execute computer-readable program code to:
access one or more devices associated with the at least one of the one or more computing devices, wherein the one or more devices comprises a microphone, an image capturing device, and a speaker based on at least determining that the user has authorization to access the at least one of the one or more computing devices.

3. The system of claim 1, wherein the at least one processing device is further configured to execute computer-readable program code to:
initiate the augmented reality application for display on the at least one of the one or more computing devices, wherein initiating further enables a data path connection between the first user computing device and the at least one of the one or more computing devices, thereby connecting the first user computing device to a dispersed network.

4. The system of claim 1, wherein the at least one processing device is further configured to execute computer-readable program code to:
receive content from a plurality of computing devices connected to the dispersed network based on at least determining that the user has authorization to access the plurality of the computing devices; and
dynamically configure the display device associated with the first user computing device to display each content received from the plurality of computing devices simultaneously.

5. The system of claim 1, wherein the at least one processing device is further configured to execute computer-readable program code to:
receive, via a second user computing device, a second user request for authorization to access the content transmitted between the at least one of the one or more computing devices and the first user computing device; and
determine an access level associated with the second user computing device, wherein the access level defines one or more actions executable by the second user computing device to cause a change in the content displayed.

6. The system of claim 5, wherein the at least one processing device is further configured to execute computer-readable program code to:
reconfigure, via the augmented reality application, a display device associated with the second user computing device to emulate the content displayed on the display device associated with at least one of the one or more computing devices and/or the display device of the first user computing device on the display device of the second user computing device based on at least the access level associated with the second user computing device.

7. The system of claim 1, wherein the at least one processing device is further configured to execute computer-readable program code to:
engaging, automatically, the emulation of the content displayed on the display device associated with at least one of the one or more computing devices on the display device of the first user computing device based on at least determining that the at least one of the one or more computing devices and/or the first user computing device is not associated with at least one trigger event.

8. The system of claim 1, wherein the at least one processing device is further configured to execute computer-readable program code to:
assign a graphical indicator to each of the one or more identified objects to be displayed on the first user computing device, wherein the graphical indicator comprises at least a tab, a link, a graphic, or an image, wherein the graphical indicator comprises at least a numerical value indicating dimensional information of each of the one or more features associated with each of the one or more identified objects.

9. A computerized method for tracking resource allocation/usage across a dispersed Internet protocol capable network connecting devices electrically attached to the network, the method comprising:
initiating, via a computing device processor, a control path connection on a network layer between one or more computing devices attached to a dispersed network and at least one distributed server;

receiving, from a first user computing device, a first user request for authorization to access at least one of the one or more computing devices;

initiating, via a computing device processor, the augmented reality application for display on the at least one of the one or more computing devices based on at least determining that the user has authorization to access the at least one of the one or more computing devices;

reconfiguring, via the augmented reality application and using one or more software applications stored on the first computing device, a display device associated with the first user computing device to emulate a content displayed on a display device associated with at least one of the one or more computing devices on the display device of the first user computing device, wherein emulating further comprises duplicating the content displayed on the display device associated with at least one of the one or more computing devices, and a behavior of at least one of the one or more computing devices on the first user computing device using one or more software applications stored on the first computing device;

retrieving, using the first user computing device, information from the content, wherein the information comprises one or more objects;

processing, using the first computing device, the retrieved information, wherein processing further comprises:
extracting one or more features from the one or more objects; and
identifying the one or more objects based on at least the extracted features;

determining, via a computing device processor, dimensional information associated with the one or more objects by capturing one or more geometric figures and images resulting from projecting the one or more objects on to another surface;

determining, via a computing device processor, dimensional information associated with the at least one surrounding environment;

transmitting, via a computing device processor, control signals configured to cause the display device associated with at least one of the one or more computing devices and/or the display device of the first user computing device to display the one or more identified objects and the at least one surrounding environment associated with the one or more identified objects;

determining, via a computing device processor, that the at least one of the one or more computing devices and/or the first user computing device is associated with at least one trigger event, wherein the triggering event comprises: (i) the at least one of the one or more computing devices being exposed a predetermined low levels of illumination for a first predetermined extended period of time, (ii) the at least one of the one or more computing devices being stationary for a second predetermined extended period of time, or (iii) a power source of the at least one of the one or more computing devices being associated with predetermined low levels; and disengaging, via a computing device processor, the emulation of the content displayed on the display device associated with at least one of the one or more computing devices on the display device of the first user computing device based on at least determining that the at least one of the one or more computing devices and/or the first user computing device is associated with at least one trigger event.

10. The method of claim 9, wherein the method further comprises:
accessing one or more devices associated with the at least one of the one or more computing devices, wherein the one or more devices comprises a microphone, an image capturing device, and a speaker based on at least determining that the user has authorization to access the at least one of the one or more computing devices.

11. The method of claim 9, wherein the method further comprises:
initiating the augmented reality application for display on the at least one of the one or more computing devices, wherein initiating further enables a data path connection between the first user computing device and the at least one of the one or more computing devices, thereby connecting the first user computing device to a dispersed network.

12. The method of claim 9, wherein the method further comprises:
receiving content from a plurality of computing devices connected to the dispersed network based on at least determining that the user has authorization to access the plurality of the computing devices; and
dynamically configuring the display device associated with the first user computing device to display each content received from the plurality of computing devices simultaneously.

13. The method of claim 9, wherein the method further comprises:
receiving, via a second user computing device, a second user request for authorization to access the content transmitted between the at least one of the one or more computing devices and the first user computing device; and
determining an access level associated with the second user computing device, wherein the access level defines one or more actions executable by the second user computing device to cause a change in the content displayed.

14. The method of claim 13, wherein the method further comprises:
reconfiguring, via the augmented reality application, a display device associated with the second user computing device to emulate the content displayed on the display device associated with at least one of the one or more computing devices and/or the display device of the first user computing device on the display device of the second user computing device based on at least the access level associated with the second user computing device.

15. The method of claim 9, wherein the method further comprises assigning a graphical indicator to each of the one or more identified objects to be displayed on the first user computing device, wherein the graphical indicator comprises at least a tab, a link, a graphic, or an image, wherein the graphical indicator comprises at least a numerical value indicating dimensional information of each of the one or more features associated with each of the one or more identified objects.

16. A computer program product for tracking resource allocation/usage across a dispersed Internet protocol capable network connecting devices electrically attached to the network, the computer program product comprising a non-transitory computer-readable medium comprising code causing a first apparatus to:

initiate a control path connection on a network layer between one or more computing devices attached to a dispersed network and at least one distributed server;

receive, from a first user computing device, a first user request for authorization to access at least one of the one or more computing devices;

initiate the augmented reality application for display on the at least one of the one or more computing devices based on at least determining that the user has authorization to access the at least one of the one or more computing devices;

reconfigure, via the augmented reality application and using one or more software applications stored on the first computing device, a display device associated with the first user computing device to emulate a content displayed on a display device associated with at least one of the one or more computing devices on the display device of the first user computing device, wherein emulating further comprises duplicating a content displayed on the display device associated with at least one of the one or more computing devices, and a behavior of at least one of the one or more computing devices on the first user computing device;

retrieve, using the first user computing device, information from the content, wherein the information comprises one or more objects;

process, using the first computing device, the retrieved information, wherein processing further comprises:
        extracting one or more features from the one or more objects; and
        identifying the one or more objects based on at least the extracted features;

determine dimensional information associated with the one or more objects by capturing one or more geometric figures and images resulting from projecting the one or more objects on to another surface;

determine at least one surrounding environment based on at least identifying the one or more objects;

determine dimensional information associated with the at least one surrounding environment;

transmit control signals configured to cause the display device associated with at least one of the one or more computing devices and/or the display device of the first user computing device to display the one or more identified objects and the at least one surrounding environment associated with the one or more identified objects;

determine that the at least one of the one or more computing devices and/or the first user computing device is associated with at least one trigger event, wherein the triggering event comprises: (i) the at least one of the one or more computing devices being exposed a predetermined low levels of illumination for a first predetermined extended period of time, (ii) the at least one of the one or more computing devices being stationary for a second predetermined extended period of time, or (iii) a power source of the at least one of the one or more computing devices being associated with predetermined low levels; and     disengage the emulation of the content displayed on the display device associated with at least one of the one or more computing devices on the display device of the first user computing device based on at least determining that the at least one of the one or more computing devices and/or the first user computing device is associated with at least one trigger event.

17. The computer program product of claim 16, wherein the first apparatus is further configured to:

access one or more devices associated with the at least one of the one or more computing devices, wherein the one or more devices comprises a microphone, an image capturing device, and a speaker based on at least determining that the user has authorization to access the at least one of the one or more computing devices.

18. The computer program product of claim 16, wherein the first apparatus is further configured to:

initiate the augmented reality application for display on the at least one of the one or more computing devices, wherein initiating further enables a data path connection between the first user computing device and the at least one of the one or more computing devices, thereby connecting the first user computing device to a dispersed network.

19. The computer program product of claim 16, wherein the first apparatus is further configured to:

receive content from a plurality of computing devices connected to the dispersed network based on at least determining that the user has authorization to access the plurality of the computing devices; and     dynamically configure the display device associated with the first user computing device to display each content received from the plurality of computing devices simultaneously.

20. The computer program product of claim 16, wherein the first apparatus is further configured to:

receive, via a second user computing device, a second user request for authorization to access the content transmitted between the at least one of the one or more computing devices and the first user computing device; and     determine an access level associated with the second user computing device, wherein the access level defines one or more actions executable by the second user computing device to cause a change in the content displayed.

\* \* \* \* \*